United States Patent [19]
Maeno et al.

[11] Patent Number: 5,625,145
[45] Date of Patent: Apr. 29, 1997

[54] ANGULAR VELOCITY DETECTION METHOD AND ANGULAR VELOCITY DETECTION APPARATUS

[75] Inventors: Takashi Maeno, Kawasaki; Takayuki Tsukimoto, Fujisawa; Hajime Kanazawa, Tama; Ichiro Chiba, Yokohama, all of Japan

[73] Assignee: Canon Kabushiki Kaisha, Tokyo, Japan

[21] Appl. No.: 228,268

[22] Filed: Apr. 15, 1994

[30] Foreign Application Priority Data

Apr. 16, 1993 [JP] Japan ................... 5-089895

[51] Int. Cl.$^6$ ........................................ G01P 9/04
[52] U.S. Cl. ........................................ 73/504.12
[58] Field of Search ................ 73/505, 504, 510, 73/504.04, 504.12, 504.16, 504.01, 504.02; 310/333

[56] References Cited

U.S. PATENT DOCUMENTS

| | | | |
|---|---|---|---|
| 4,811,613 | 3/1989 | Phillips et al. | 74/5.6 |
| 4,821,572 | 4/1989 | Hulsing, II | 73/504.04 |
| 4,903,531 | 2/1990 | LeBlond et al. | 73/4.05 |
| 5,166,571 | 11/1992 | Konno | 73/504.16 |
| 5,193,391 | 3/1993 | Cage | 73/504.15 |

FOREIGN PATENT DOCUMENTS

| | | |
|---|---|---|
| 88061114 | 3/1988 | Japan . |
| 89016911 | 1/1989 | Japan . |
| 89140013 | 6/1989 | Japan . |
| 90218914 | 8/1989 | Japan . |
| 90198315 | 8/1990 | Japan . |
| 92025714 | 1/1992 | Japan . |
| 2113842 | 8/1983 | United Kingdom . |

*Primary Examiner*—Christine K. Oda
*Attorney, Agent, or Firm*—Fitzpatrick, Cella, Harper & Scinto

[57] ABSTRACT

In an angular velocity detection arrangement, a vibration member excites and detects vibration in different directions and the angular velocity is detected by detecting a vibration in directions other than the direction of a vibration excited by the vibration member.

27 Claims, 13 Drawing Sheets

C MODE (TORSION 1ST ORDER MODE)

ANGULAR DEVIATION AROUND Z AXIS

A MODE (BENDING 1ST ORDER MODE)

B MODE (BENDING 1ST ORDER MODE)

VIBRATION MODE TO Z DIRECTION

DISTORTION OF Z DIRECTION AT SURFACE OF PART OF SMALL DIAMETER BY BENDING

DISTORTION OF Z DIRECTION AT SURFACE OF PART OF SMALL DIAMETER BY TORTION

ANGULAR VELOCITY DETECTION METHOD AND ANGULAR VELOCITY DETECTION APPARATUS

BACKGROUND OF THE INVENTION

1. Field of the Invention

The present invention relates to a method of and an apparatus for angular velocity detection.

2. Related Background Art

A vibration gyro is known as one of means for detecting an angular velocity. Based on the principle that "a Coriolis force is produced when an angular velocity is applied to an object with a velocity", the vibration gyro adds a vibration to the object to cause it to have a velocity, receives the Coriolis force produced when an angular velocity is applied to the object, and detects the Coriolis force proportional to the angular velocity entered as a displacement of the spring system, thus detecting an angular velocity applied to the object.

An object of this vibration gyro which applies a vibration, that is, a vibration member is available in a shape of a tuning fork or a H-shape. However, the conventional vibration gyro has a single vibration member with a structure which permits mere detection of rotation in a plane and an angular velocity applied to the object.

In detection of the angular velocity of a camera or other moving object on which the above conventional single-axis type vibration gyro, not only a one-dimensional angular velocity component but also two-dimensional and three-dimensional components are generally produced from the moving object. Therefore the conventional vibration gyro which has only been able to detect the angular velocity in a single-axis direction is not suitable for precisely detecting the angular velocity.

Hence various types of vibration gyro capable of detecting angular velocities of two-axis direction components have been proposed. This two-axis type vibration gyro has been disclosed in Japanese Patent Application Laid-open No. 63-61114, No. 64-16911, No. 1-140013, No. 2-198315, No. 2-218914 and No. 4-25714.

FIG. 22 shows a vibration gyro disclosed in Japanese Patent Application Laid-open No. 64-16911.

The conventional vibration gyro shown in FIG. 22 is adapted to have H-shaped vibration members 1 and 2 which are assembled to orthogonally intersect each other, apply an AC voltage to piezoelectric elements 4 and 5 connected to the sides of respective vibration members 1 and 2 to vibrate these vibration members 1 and 2 to give a velocity, and detect a distortion of the Coriolis force in two axial directions as electro-mechanical conversion signals from piezoelectric elements 6 and 7 connected to two orthogonally intersecting sides of a square support bar 3 which is extended in the Y direction, thus obtaining the angular velocity.

The above other related arts employ a structure which is basically a combination of two vibration systems.

The above-described related art vibration gyro includes a problem that it has required two vibration systems and the drive and detection circuits respectively for the vibration systems and therefore it has been inevitably complicated in construction and large-sized in the electric circuit.

Most examples of the related arts include a problem that displacement is small and the output level of detection signal is low since a vibration caused by the Coriolis force is not a resonance vibration.

SUMMARY OF THE INVENTION

One aspect of the invention is an angular velocity detection method for detecting an angular velocity by using a single vibration member capable of exciting and detecting a plurality modes of vibration which have a plurality of axial direction components, exciting one vibration mode of the above plurality of vibration modes and detecting vibration of other vibration modes.

Another aspect of the invention is an angular velocity detecting apparatus for detecting an angular velocity in one axis along with excitation of vibration in the other axis by fixing a plurality of energy conversion elements for exciting and detecting the vibration in a plurality of axial directions on a single vibration elastic member.

BRIEF DESCRIPTION OF THE DRAWINGS

FIG. 5A is a disassembled perspective view and FIG. 5B is a diagram showing the development;

FIG. 8A is an angular velocity produced around the x axis and FIG. 8B is angular velocity produced around the y axis;

FIG. 9A is a bending mode on a z-x plane and FIG. 9B is a bending mode on a z-y plane;

FIG. 12A is a perspective view and FIG. 12B is an illustration of the vibration mode in the z direction;

FIG. 15A is a plan view showing the state of vibration of the vibration member, FIG. 15B is an illustration of a state of detection of the angular velocity around the x axis and FIG. 15C is an illustration of a state of vibration of the vibration member when the angular velocity is produced around the x axis shown in FIG. 5B;

FIG. 18A is a perspective view and FIG. 18B is an illustration of a state of polarization;

FIG. 19A is a side view of the vibration member, FIG. 19B is a diagram showing distortion in the z direction in the bending mode and FIG. 19C is a diagram showing distortion in the z direction by the torsional mode;

DETAILED DESCRIPTION OF THE PREFERRED EMBODIMENTS

Figure 1:
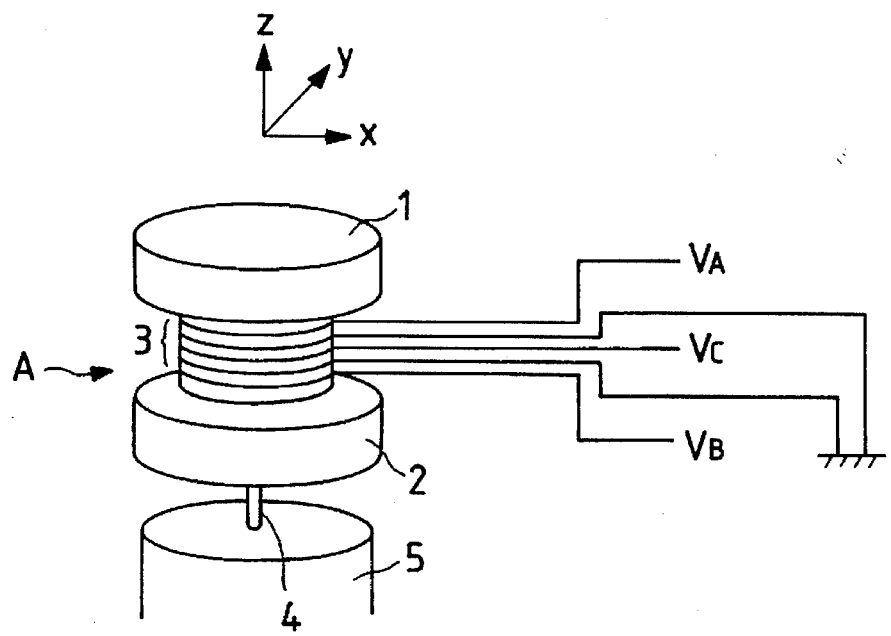
FIG. 1 is a schematic perspective view of a first embodiment of the invention.
Figure 2:
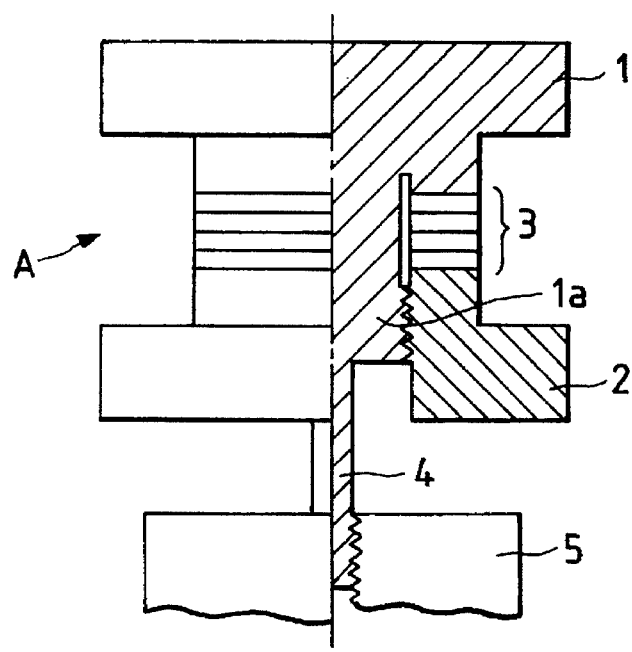
FIG. 2 is a sectional view of a vibration member of the first embodiment.

FIGS. 1 and 2 respectively show a first embodiment of a vibration gyro according to the invention.

Character A denotes a vibration member of a vibration gyro supported on a support block 5 with a support bar 4. Larger diameter parts are provided at upper and lower sides of a central axial part with a smaller diameter whereby a plurality of piezoelectric elements 3 are arranged in layers at the smaller diameter central axial part in the axial direction.

The vibration member A is formed as shown in FIG. 2 so that the larger diameter part is provided at its one end and a first vibration part 1 which has an external thread and a second vibration part 2 are thread-engaged together at its other end, and piezoelectric elements 3 are fixed by and between these first and second vibration parts. The support bar 4 is integrally formed with the lower part of the first vibration part 1 and the other end of the support bar 4 is thread-fitted to the support block 5.

Figure 3:
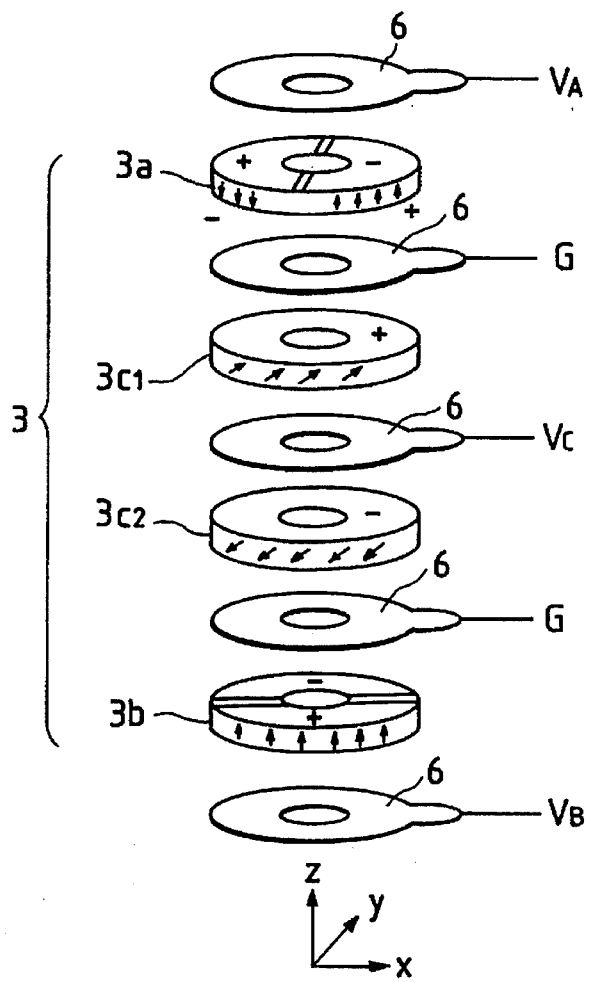
FIG. 3 is a disassembled perspective view illustrating the arrangement of piezoelectric elements provided on the vibration member of the first embodiment and the directions of their polarization.

The piezoelectric elements 3 are made up by piling up four piezoelectric elements $3a$, $3b$, $3c_1$, and $3c_2$ with electrode plates 6 provided therebetween as shown in FIG. 3. In FIG. 3, the arrow indicates the direction of polarization.

Piezoelectric elements $3a$, $3b$, $3c_1$, and $3c_2$ respectively provide the function as electro-mechanical conversion elements for vibrating the vibration member A and the function as mechanic-electrical conversion elements for picking up a vibration given to the vibration member A as a signal for detecting the angular velocity whereby the piezoelectric element $3a$ is used for excitation and detection of a bending mode (hereafter referred to as the "bending A mode") in the x-z plane, the piezoelectric element $3b$ for excitation and detection of a bending mode (hereafter referred to as the "bending B mode") in the y-z plane and piezoelectric elements $3c_1$ and $3c_2$ for excitation and detection of a torsional vibration (hereafter referred to as the "C mode") around the z axis.

The configuration of the piezoelectric elements which permit excitation and detection of these modes is described below.

Figure 9A:
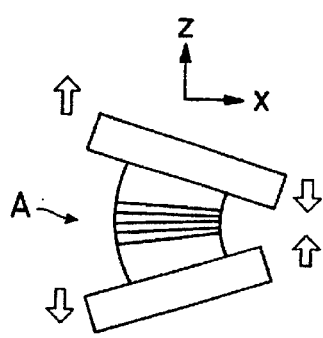
FIGS. 9A and 9B respectively show a bending mode in the first embodiment.

The piezoelectric element $3a$ is polarized to have different polarities at its right and left sides with the diametral part in the y direction as a border and, when an AC voltage $V_A$ is applied to the piezoelectric element $3a$, it is distorted in the out-of-plane direction which is the direction of thickness and conducts a vibration of the A mode shown in FIG. 9A to the vibration member A.

Figure 9B:
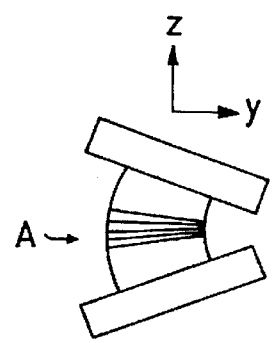

The piezoelectric element $3b$ is formed in the same construction as the piezoelectric element $3a$ and arranged with a phase difference of 90° from the piezoelectric element $3a$ and, when an AC voltage Vb is applied to it, the piezoelectric element $3b$ is distorted in the out-of-plane direction and conducts a vibration of the B mode shown in FIG. 9B to the vibration member A.

Figure 4A:
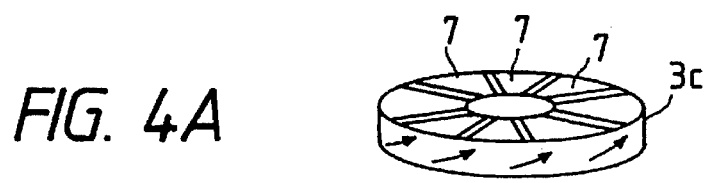
FIGS. 4A and 4B are respectively an illustration showing the polarization pattern of piezoelectric elements for a torsional vibration mode to be used in the first embodiment.
Figure 4B:
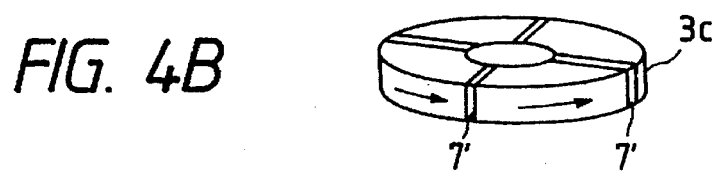

Piezoelectric elements $3c_1$ and $3c_2$ are polarized as shown in FIGS. 4A or 4B and conduct a torsional vibration around the z axis to the vibration member A. Piezoelectric elements $3c_1$ and $3c_2$ are formed by reversely arranged the piezoelectric elements of the same structure so that the directions of torsion are reversed.

Polarization shown in FIG. 4A is such that radially separated electrodes are provided both on the front and rear surfaces of the piezoelectric element and obliquely polarized by applying a voltage to every other electrodes on the front and rear surfaces in the circumferential direction. Polarization shown in FIG. 4B is such that the piezoelectric element is divided into four quarter sections and electrodes 7' are disposed between adjacent quarter sections and polarized in the circumferential direction by applying a voltage to the electrodes.

Figure 5A:
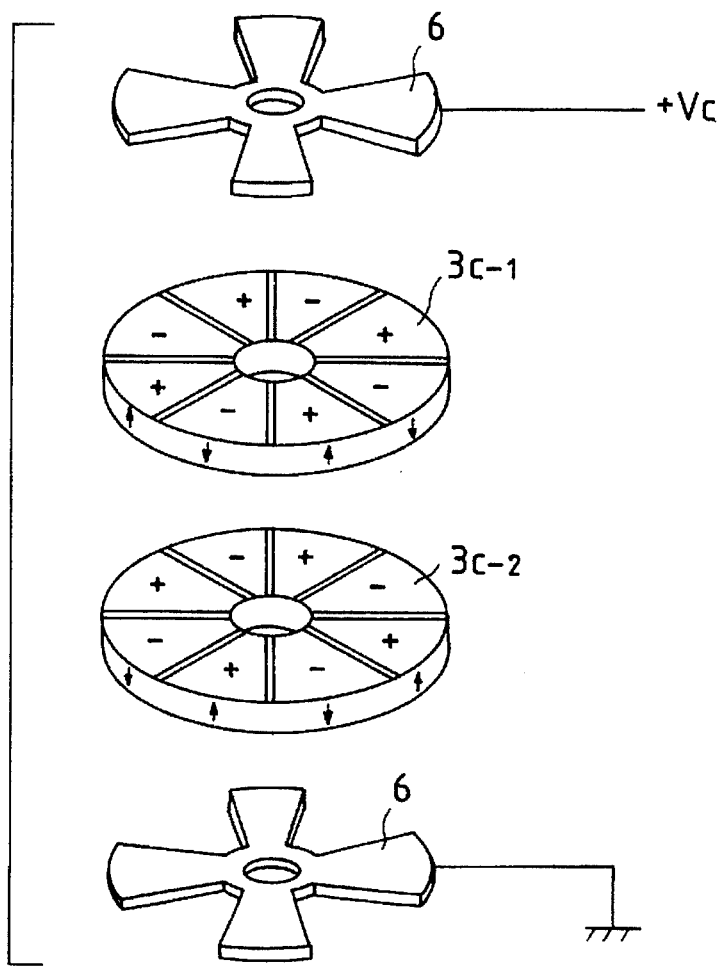
FIGS. 5A and 5B are respectively another example of the piezoelectric vibration mode.
Figure 5B:
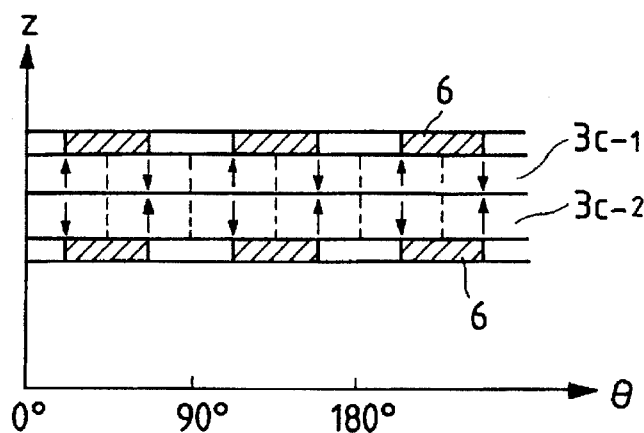

The structure of the piezoelectric element for producing a torsional vibration can be as shown in FIGS. 5A and 5B.

This type of structure shown in FIG. 5A is such that piezoelectric elements 3c-1 and 3c-2 which are radially divided into eight polarized portions so that a distortion is caused in the direction of thickness are piled up and a cross-shaped electrode plate 6 is held in contact on the upper surface of the piezoelectric element 3c-1 and the lower surface of the piezoelectric element 3c-2 so that these electrode plates 6 hold the piezoelectric elements. 3c-1 and 3c-2 between themselves. In this case, the segments of the electrode plates contact the piezoelectric elements in half ranges from the borders as shown as the hatched portions in FIG. 5B.

When a voltage Vc is applied, the distortion in the direction of thickness shown with the arrows between a pair of electrode segments is reversed and a distortion is caused in an oblique direction owing to a balance of force and a torsional vibration can be produced on the vibration member.

The above describes the case that the piezoelectric elements are actuated to function as the electro-mechanical energy conversion elements, that is, as a function to produce a vibration to give an angular velocity necessary for detection to the vibration member. On the contrary, when a vibration of the A mode, B mode or C mode is applied to the vibration member, voltages $V_A$, $V_B$ or $V_C$ in proportion to the amplitude of vibration is outputted from the piezoelectric element $3a$, $3b$, $3c_1$ or $3c_2$.

In this embodiment, the length and the diameter of the vibration member are set so that the natural frequency of the vibration member is almost the same in the A, B and C modes and, as described later, the natural frequency in A, B and C modes can be varied by a certain specified value.

In the above-described structure of the vibration member, angular velocities of two axes can be detected from other two modes by exciting one of A, B and C modes. The following describes an example for detecting the angular velocities of two axes from A and B modes by exciting the C mode.

Figure 6A:
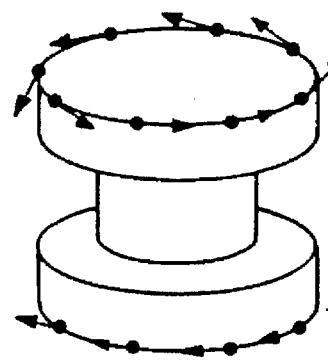
FIGS. 6A and 6B are respectively an illustration of a torsional vibration mode in the first embodiment.
Figure 6B:

When an AC voltage Vc the frequency of which is approximate to the natural frequencies of A, B and C modes is applied to piezoelectric elements $3c_1$ and $3c_2$, a torsion first order mode as shown in FIGS. 6A and 6B is excited on the vibration member A. The arrows in the drawings indicate a direction and an amplitude of physical quantities (displacement, velocity, etc.) in relation to the vibration. In this case, the velocity of some points are shown.

Figure 7:
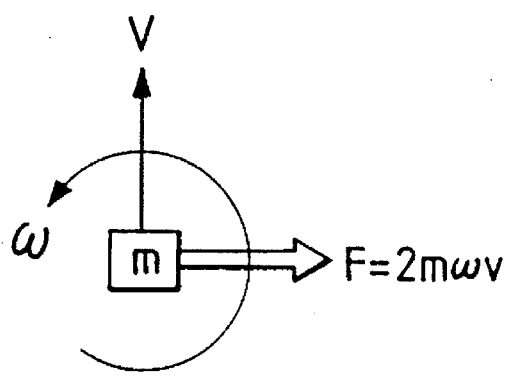
FIG. 7 is an illustration of a principle of the Coriolis force.

As shown in FIG. 7, when mass m moves at velocity v and carries out a relative motion at angular velocity ω, Coriolis acceleration 2ωv and Coriolis force F=2mωv shown with the arrow acts on mass m.

Figure 8A:
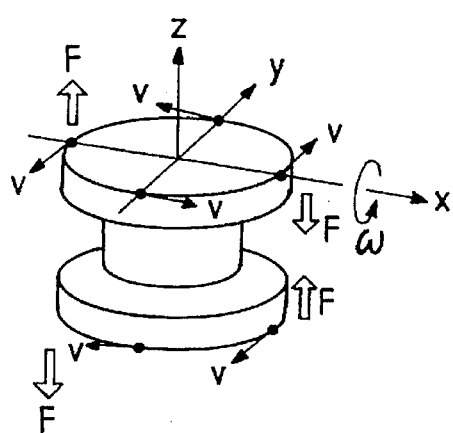
FIGS. 8A and 8B respectively show a state of detection of the angular velocity in the first embodiment.

Accordingly, when an angular velocity around the x axis is applied to the vibration member which carries torsional vibration as shown in FIG. 8A, a Coriolis force shown with the non-shaded arrow acts on a part having a velocity component which orthogonally intersects the x axis. Since this Coriolis force serves as a compression force in the z axis direction at the positive position of the x axis and as a pulling force at a negative position thereof, a bending mode of the z-x plane as shown in FIG. 9A is produced on the vibration member A. At this time, a voltage is produced on the piezoelectric element 3a. Particularly, if the frequency of vibrations of the bending mode is approximate to the natural frequency, the displacement is expanded by resonance and a large voltage is obtained at the piezoelectric element 3a. This voltage is a quantity proportional to the angular velocity around the x axis.

Figure 8B:
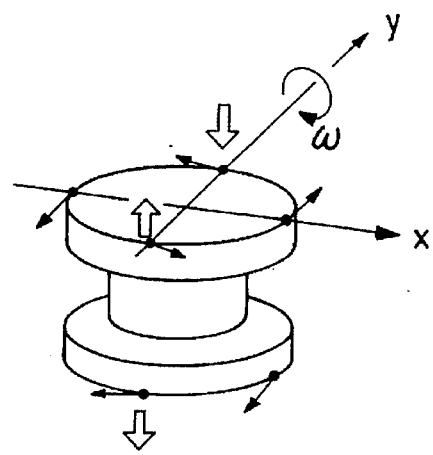

When an angular velocity around the y axis is applied to the vibration member which carries torsional vibration as shown in FIG. 8B, a Coriolis force shown with the non-shaded arrow acts on a part having a velocity component which orthogonally intersects the y axis. Since this Coriolis force serves as a compression force in the z axis direction at the positive position of the y axis and as a pulling force at a negative position thereof, a bending mode of the y-z plane as shown in FIG. 9B is produced and a voltage is produced on the piezoelectric element 3b. If the displacement is expanded by resonance, a large voltage is obtained at the piezoelectric element 3b. This voltage is a quantity proportional to the angular velocity around the y axis.

Though vibrations of bending A and B modes proportional to the angular velocities around x and y axes are produced by exciting the torsional mode c in the above example, the angular velocities around two axes can be obtained from other bending modes and the torsional mode c by exciting one of bending modes.

If, for example, the torsional mode and the bending mode are used as the modes to be excited in sequence by changing over in a time sharing method, the outputs from each two axes, the outputs of three axes in total, can be obtained.

In this embodiment, the diameter of both ends of the vibration member A is increased for the following reasons.

1) A type of mode with which a bending deformation is prone to be excited by a force in the z direction, that is, bending modes with a large displacement and velocity in the z direction are obtained.
2) Coriolis force 2mωv is increased by increasing mass m of both ends where the torsional velocity v is largest.
3) The vibration member which is short in length and can be easily controlled is made by reducing the natural frequency of the bending mode and the torsional mode.

The vibration member can be made in another shape, for example, a bar or square column without variation of the diameter.

Figure 10:
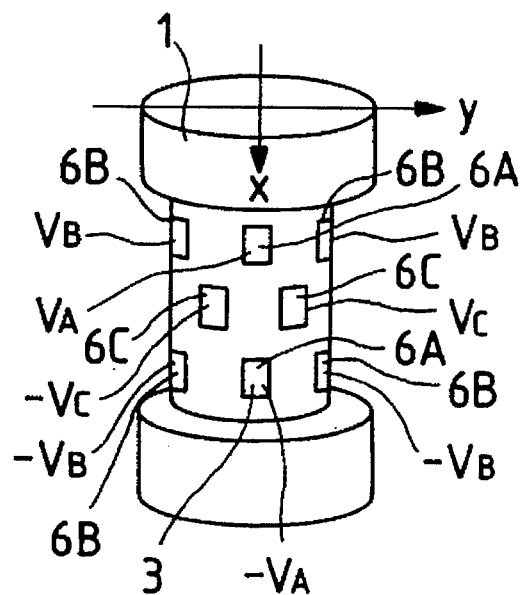
FIG. 10 is a perspective view of a second embodiment.

FIG. 10 shows the second embodiment.

The appearance and shape of the vibration member in this embodiment are the same as in the first embodiment, and the vibration member is formed with a piezoelectric element and an electrode pattern is printed on the surface thereof. In this embodiment, the vibration member is provided with four electrodes for the A mode, B mode, and C mode so as to allow excitation and detection of the A mode, B mode, and C mode as in the first embodiment.

Electrodes 6A for the A mode are arranged to be apart from each other in the z axis direction, electrodes 6B for the B mode are arranged to be apart from each other in the z axis direction with a phase difference of 90° from the electrodes 6A, and electrodes 6C for the C mode are arranged to be apart from each other in the circumferential direction.

Figure 11:
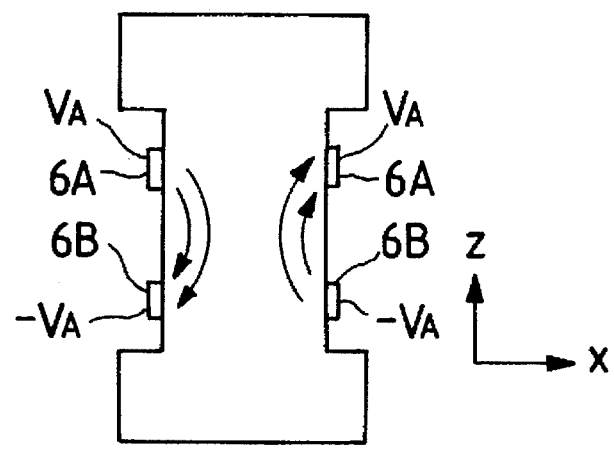
FIG. 11 is an illustration of polarization of the vibration members shown in FIG. 10.

The piezoelectric elements are polarized as shown in FIG. 11, for example, for the A mode and, when voltage $V_{A1}-V_A$ is applied across electrodes 6A, a bending mode as shown in FIG. 9A is produced and, when voltage $V_{B1}-V_B$ is applied across electrodes 6A, a bending mode as shown in FIG. 9B is produced.

Figure 18A:
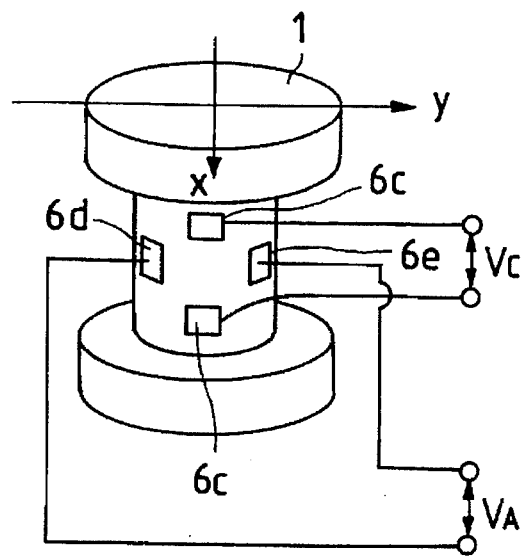
FIGS. 18A and 18B respectively show a third embodiment.
Figure 18B:
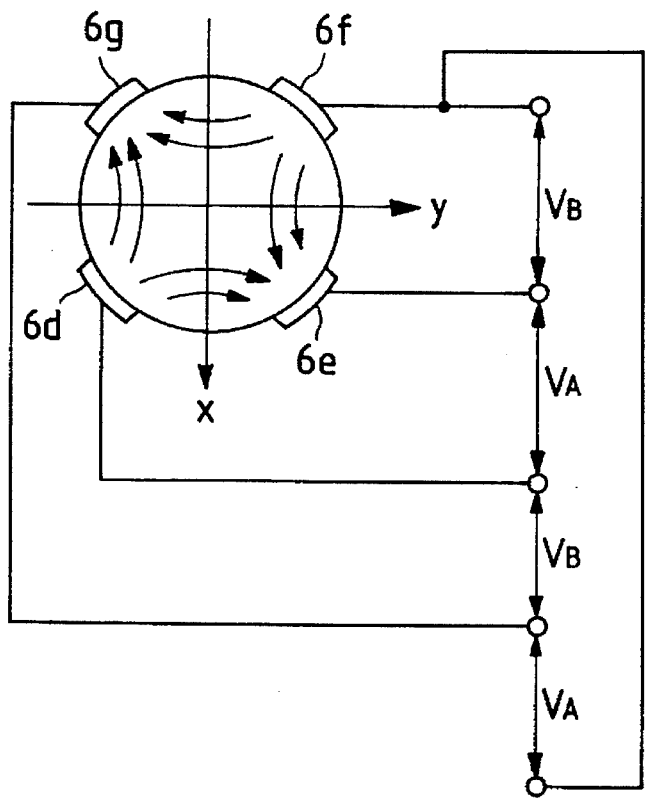

FIGS. 18A and 18B show the third embodiment which is a modification example of the second embodiment and the vibration member comprises piezoelectric elements as in the second embodiment. FIG. 18A shows an external perspective view in which electrodes 6c for the C mode are arranged along the z axis direction and four electrodes 6d–6g are arranged on the same plane with an equal pitch on the circumferential surface as shown in FIG. 18B.

When the vibration member vibrates in the x-z plane, voltage $V_A$ is produced between electrodes 6d and 6e and between electrodes 6f and 6g and, when the vibration member vibrates in the y-z plane, voltage $V_B$ is produced between electrodes 6e and electrodes 6f and between electrodes 6d and electrodes 6g whereby excitation and detection of A, B and C modes can be carried out as in the second embodiments and thus the vibration member can be used as a vibration gyro which performs similar operation to the above embodiments.

Figures 12A, 12B:
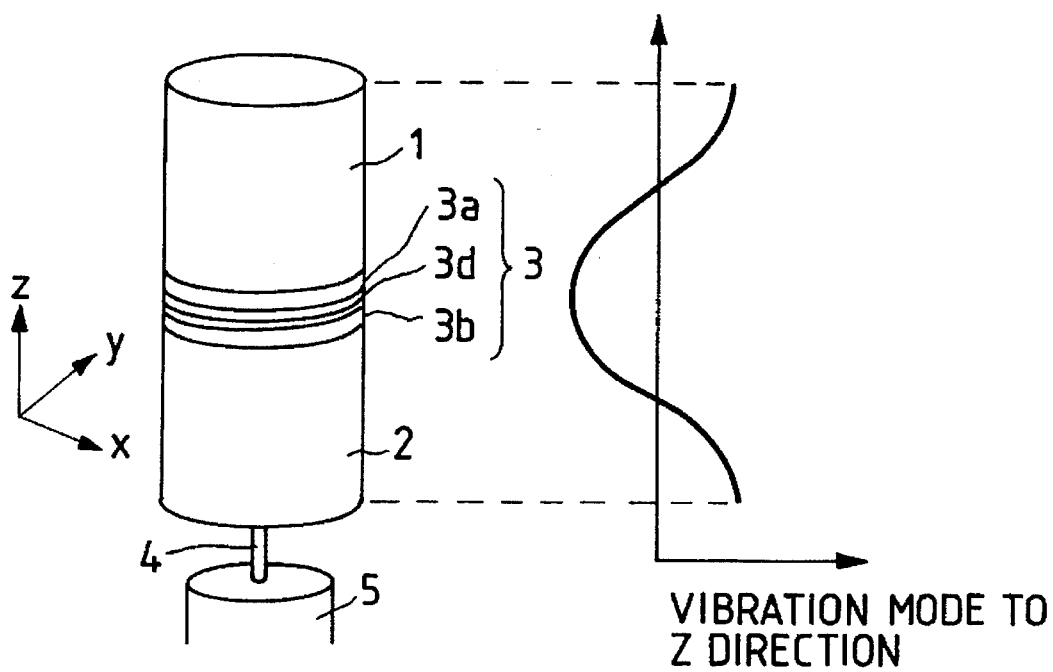
FIGS. 12A and 12B respectively show a fourth embodiment.

FIGS. 12A and 12B show the fourth embodiment which uses a longitudinal vibration second order mode and two bending first order modes.

FIGS. 12A and 12B are respectively a perspective view in which piezoelectric elements 3 for the A, B and C modes are provided between the vibration members 1 and 2 with the same diameter. Piezoelectric elements 3a and 3b are polarized in the z direction (direction of thickness) to be semi-circularly positive and negative so as to excite the bending first order mode as in FIG. 3. The piezoelectric element 3d is polarized as a whole in the z direction to excite the second order mode of longitudinal vibration as shown in FIG. 12B. The natural frequencies of two bending modes are equal. The natural frequency of longitudinal vibration can be equal or unequal to that of the bending mode.

Figure 13:
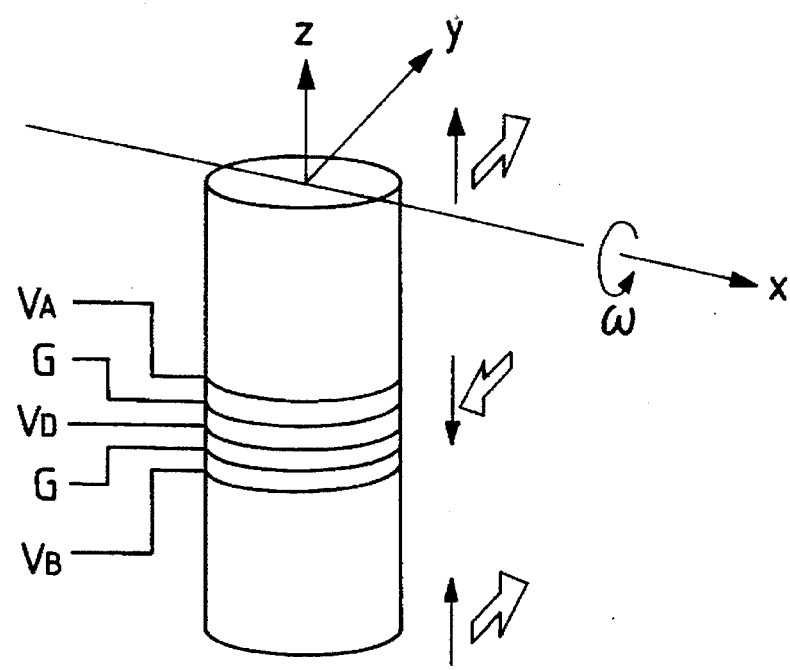
FIG. 13 is a perspective view showing a state of detection of the angular velocity in the fourth embodiment.

When an AC voltage $V_D$ is applied to the piezoelectric element 3d and the longitudinal vibration second order mode is excited by the vibration member, a velocity shown with a black arrow in FIG. 13 is produced. When an angular velocity ω around the x axis is applied to this vibration member, a Coriolis force as shown with the non-shaded arrow is produced. Consequently, the bending first order vibration in the y-z plane is produced from the vibration member and a voltage $V_A$ proportional to the angular velocity ω is produced on the piezoelectric element 3a. Similarly, when an angular velocity around the y axis is applied, the bending first order mode in the z-x plane is excited and a voltage $V_B$ proportional to the angular velocity is produced.

Thus a 2-axis output vibration gyro is obtained. This vibration gyro can be used as a 3-axis vibration gyro as in the above-described embodiments if the excitation mode is changed over by time sharing.

Figure 14:
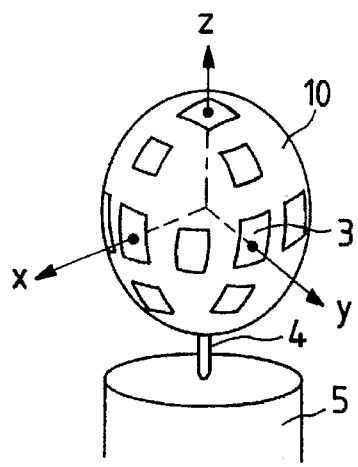
FIG. 14 is a perspective view of a fifth embodiment.
Figure 15A:
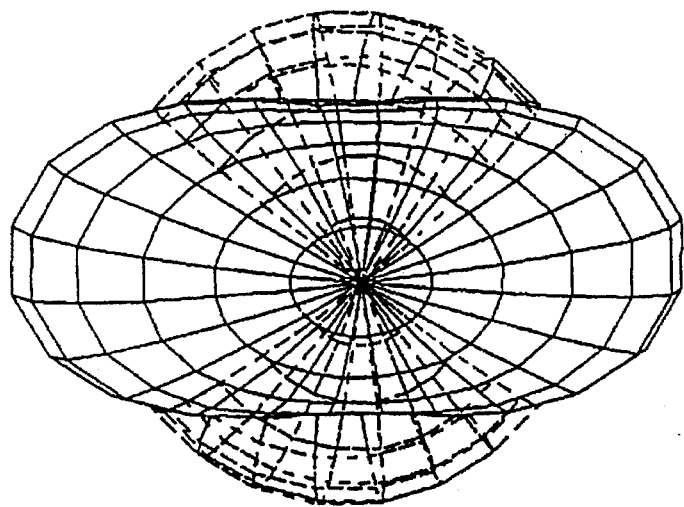
FIGS. 15A to 15C respectively show a method for detecting the angular velocity in the fifth embodiment.
Figure 15B:
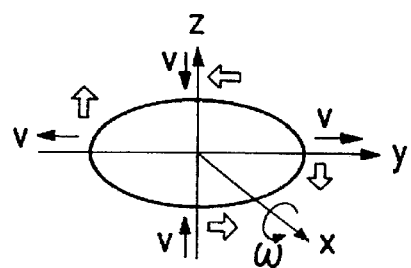
Figure 15C:
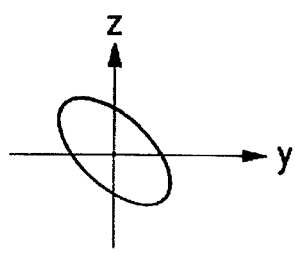

FIGS. 14 to 15C are respectively an illustration of a fifth embodiment.

Piezoelectric elements 3 are adhered to the surface of a elastic member 10 which comprises a solid or hollow spherical shell, which is supported on the support block 5 with the support bar 4.

The spherical elastic member 10 is polarized to provide vertical vibration modes in the directions of x, y and z axes with the same natural frequency and provided with respective electrodes for such polarization as shown in FIG. 15A. When one of these vibration modes, for example, a vibration in the y-z plane as shown in FIG. 15B is excited and an angular velocity around the x axis is applied, a Coriolis force as shown with the non-shaded arrow works, a vibration in the y-z plane as shown in FIG. 15C is produced and thus the spherical member can be used as a multi-axis output vibration gyro as in the embodiments described above by using the above-described action.

Figure 16:
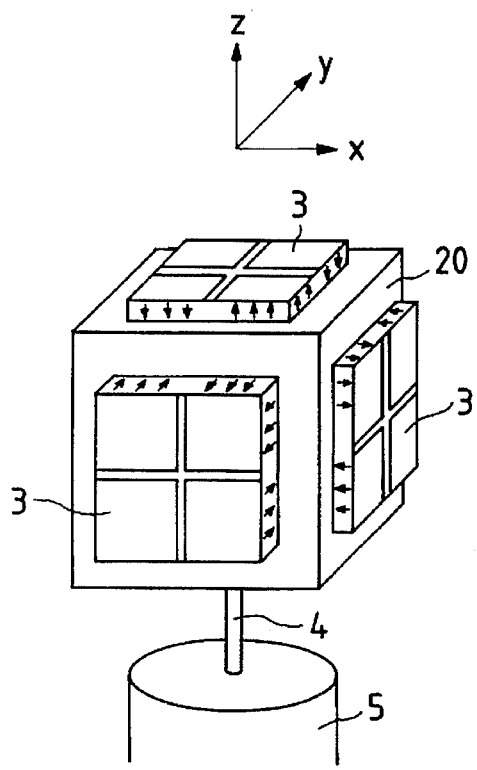
FIG. 16 is a perspective view of a sixth embodiment.

FIG. 16 shows a sixth embodiment, which relates to a resilient member 20 comprising the vibration member which is formed as a cubic member. Piezoelectric elements 3 are adhered to a solid or hollow resilient member 20. If the directions of polarization of piezoelectric elements to be adhered are determined so that a vibration in any direction can be detected as shown, it can be used as a multi-axis output vibration gyro as in case of a spherical resilient member by using vertical vibration in three axial directions.

An embodiment for improving the angular velocity detection accuracy is described below with an example of the vibration member which uses the torsional mode and two bending modes as in the first embodiment.

Figure 17:
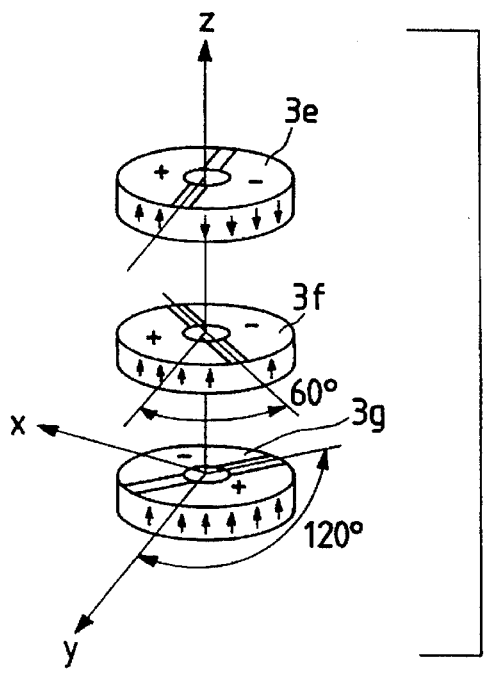
FIG. 17 is a perspective view of a piezoelectric element showing a seventh embodiment.

FIG. 17 shows a seventh embodiment which uses three piezoelectric elements $3e$, $3f$ and $3g$ for detecting the bending vibration. If, for example, the vibration member A of the first embodiment is formed to have an ideal symmetricity, no voltage is produced in piezoelectric elements $3c_1$ and $3c_2$ for detecting the bending vibration even though the torsional vibration is excited when the angular angle is zero. Actually, however, angular positions of the piezoelectric elements and shapes of the vibration members include errors due to variations of workmanship and assembly and therefore a voltage is inevitably produced on the piezoelectric elements for detection due to axial asymmetrical deformation of piezoelectric elements resulting from torsional vibration and distortion of piezoelectric elements resulting from bending vibration produced. Therefore it is necessary to cancel a voltage produced on the piezoelectric elements by addition and subtraction.

However, when a bending vibration is produced, for example, in the z-x plane, the amplitude of vibration in the x-y plane is 0 (zero) and therefore a voltage on two piezoelectric elements for orthogonally intersecting axes cannot be canceled by addition. Accordingly, piezoelectric elements $3e$, $3f$ and $3g$ for detecting the bending vibration are arranged by shifting their positional phases as much as 60°. When the bending vibration occurs in a certain direction, a voltage is always produced on two or more piezoelectric elements and this unnecessary voltage can be offset by multiplying it with a certain constant and adding up the results.

In this case, three or more piezoelectric elements can be used and an angle between them cannot be 60°.

The following methods are available to improve the detection accuracy of the angular velocity.

(1) To increase the velocity of excited vibration per unit input current.

(2) To increase the voltage produced thereof for the velocity of vibration to be excited by the Coriolis force.

To implement (1) and (2), a force factor of the mode to be excited can be decreased and a force factor of the mode for detection can be increased.

Figure 19A:
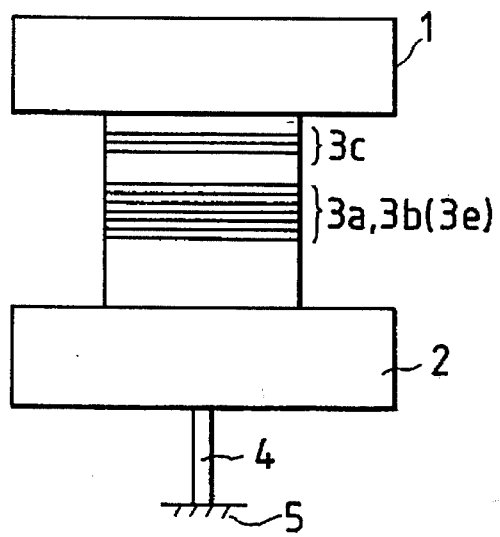
FIGS. 19A to 19C respectively show an eighth embodiment.
Figure 19B:
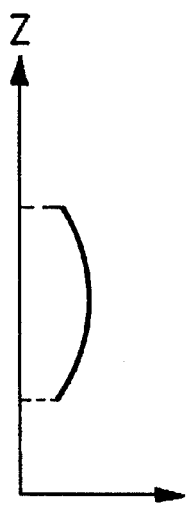
Figure 19C:
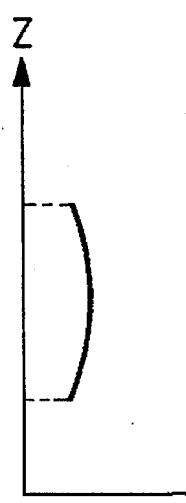

An eighth embodiment in which the above is applied to the vibration members which use torsional vibration and bending vibration is shown in FIGS. 19A to 19C.

In the eighth embodiment shown in FIGS. 19A, 19B and 19C, the force factor is decreased by providing the piezoelectric element $3c$ for exciting the torsional vibration at a portion where the distortion of torsional vibration is not largest as shown in FIG. 19B and increased by providing a plurality of piezoelectric elements $3a$ and $3b$ for detecting the bending vibration (though six piezoelectric elements are used in this embodiment, the number of piezoelectric elements can be as required) at a portion where the distortion is largest.

To implement the method described in (1) above, a value Q of the mode to be excited (indicating a quantity which denotes the sharpness of resonance) can be increased. Time t from excitation of the detection mode to the normal condition is given as below and the Q value of the detection mode is preferably a relatively small value.

$$t=Q/f$$

It is known from the above that the Q value of the mode to be excited can be larger than the Q value of the detection mode. Generally, if the force factor is decreased, the Q value tends to increase and therefore the above-described relationship of the force factor connects to implementation of the above-described relationship of the Q value.

Figure 20:
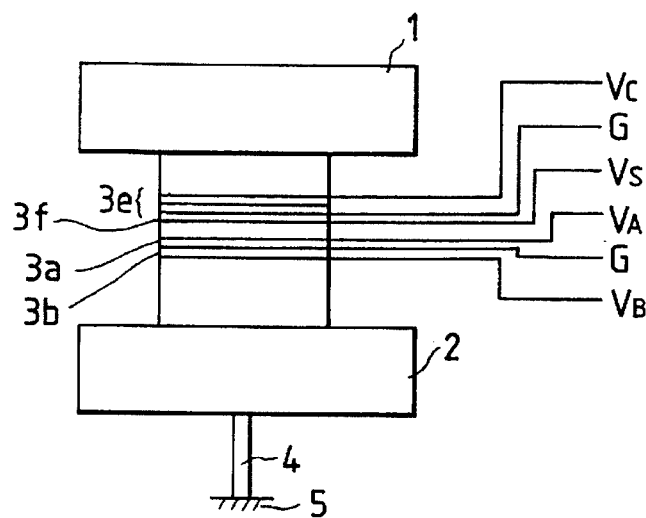
FIG. 20 is a side view of a vibration member showing a ninth embodiment.

The ratio of the input voltage of the excitation mode to the vibration velocity may vary since an internal loss and other factors change depending on the state of use. Accordingly, the piezoelectric element $3f$ for detecting a voltage $V_s$ proportional to the amplitude of torsional vibration as in the ninth embodiment shown in FIG. 20 can be provided for the vibration member which uses, for example, torsional vibration and bending vibration and controlled to fix the amplitude.

Thought the angular velocity $\omega$ has been treated as if it is a constant value, it is considered that it actually includes all frequency components.

For example, the angular velocity $\omega$ of frequency fHz is expressed as given below:

$$\omega = \omega_0 \sin(2\pi ft)$$

where, $\omega_0$ is an amplitude of angular velocity and t is time. The velocity v at a certain point of the vibration member is expressed as given below:

$$v = v_0 \sin(2\pi f_n t)$$

where, fn is an excitation frequency. The Coriolis force F is proportional to $\omega v$ and has two frequency components $fn \pm f$ as shown below:

$$\begin{aligned} F &= F_0 \sin(2\pi ft) \cdot \sin(2\pi f_n t) \\ &= (F_0/2) \cdot \cos\{2\pi (f_n - f) t\} \\ &\quad - (F_0/2) \cdot \cos\{2\pi (f_n + f) t\} \end{aligned}$$

In this case, the vibration $\omega$ is expressed as given below:

$$\omega = \omega_0 \cos 2\pi \{(f_n - f) t - \theta_1\}$$
$$+ \omega_0 \cos 2\pi \{(f_n + f) t - \theta_2\}$$

where, $\theta_1$ and $\theta_2$ are respectively a phase difference between excitation force F and displacement $\omega$.

Figure 21A:
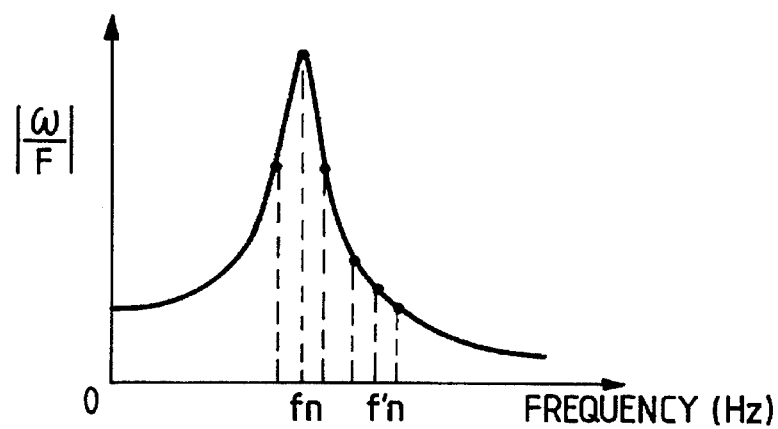
FIGS. 21A and 21B are respectively a diagram showing a relationship between an exciting force and an excitation amplitude in a tenth embodiment.
Figure 21B:
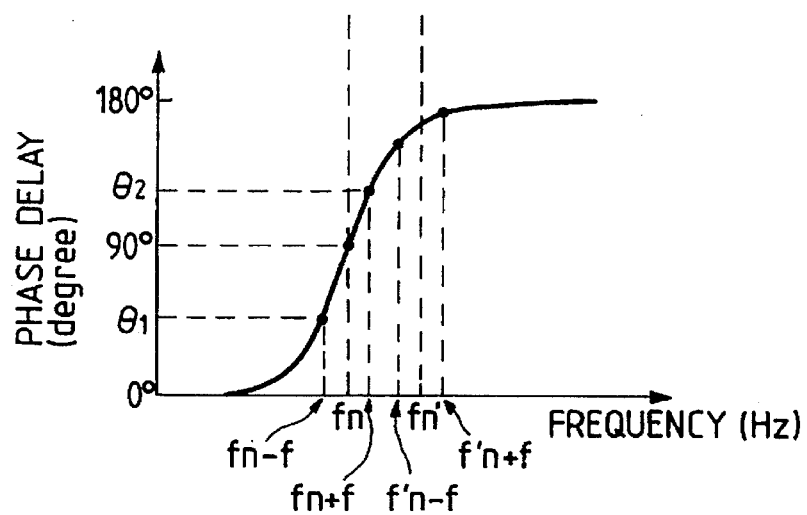
Figure 22:
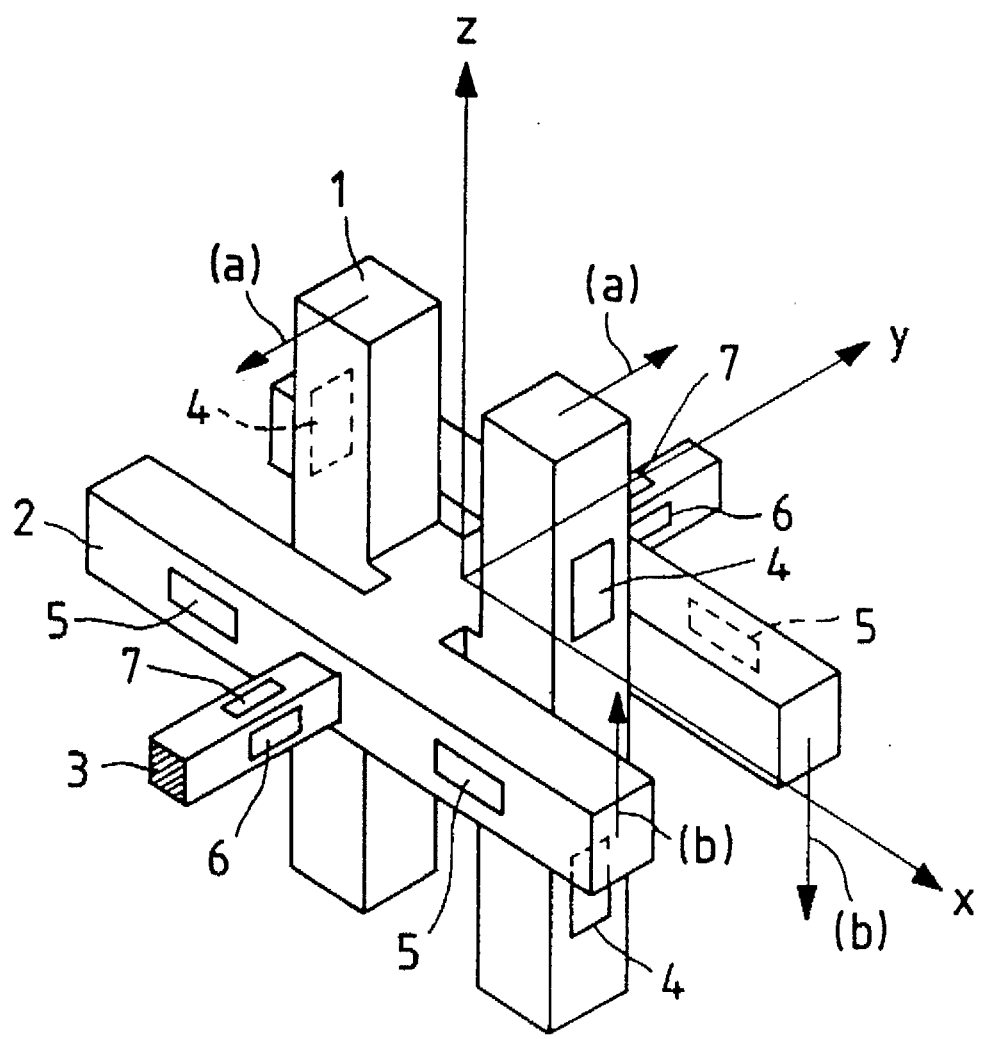
FIG. 22 is a perspective view showing a vibration member of a related art vibration gyro.

Generally, the ratio of displacement to excitation force and the phase difference at near the natural frequency is as shown in FIGS. 21A and 21B.

When the vibration is excited at a resonant frequency of the detection mode, a vibration $\omega$ of frequency fn±fHz shown in the drawings is obtained. Though the amplitude is large, the phase is substantially changed.

On the other hand, when a vibration is excited at a frequency of fn' which is not the resonant frequency, a signal of fn'±fHz is obtained. Though the amplitude of this frequency is relatively small, a variation of the phase is small. Accordingly, it can be considered that more precise detection up to high frequency $\omega$ is possible if a signal large enough to noise is obtained.

Accordingly, for example, in the first embodiment shown in FIG. 1, a high precision vibration gyro can be obtained by setting the natural frequency of torsional vibration as fn and the natural frequencies of two bending vibrations as fn' which are different from each other as much as an appropriate difference of frequency of fn'-fn.

Since frequencies fn and fn' vary with an environmental change such as temperature fluctuation, a variation of the phase difference in accordance with variations of fn and fn' can be smaller and the environmental performance can be improved by setting in advance these frequencies as fn≠fn'.

As described above, the above embodiments enable to detect angular velocities around two or three axes with a single vibration member.

Further, the vibration member can be made in a simple structure such as a tubular or spherical shape and small-sized to enable to economically provide the vibration gyro which is the angular velocity sensor.

In addition, the detection accuracy can be improved and a compact and high precision vibration gyro can be provided. If this vibration gyro is applied to an apparatus which requires space saving, for example, an image blur prevention mechanism of a camera, a super small-sized image blur prevention mechanism can be provided.

What is claimed is:

1. A method for detecting an angular velocity comprising:
   obtaining from a vibration member three vibration modes having components movable in three orthogonal axial directions which orthogonal axial directions are intersecting, one of said three vibrational modes being a torsional vibration mode around an axis of one of the three axial directions and the other two vibration modes being bending vibration modes in different planes with a phase difference of 90° which planes include axes of the three axial directions; and
   detecting an angular velocity around an axis of each of two of the axial directions by exciting one of said three vibration modes and detecting a vibration of the other two vibration modes.

2. A method according to claim 1, wherein the angular velocity is detected in a plurality of directions by sequentially changing the vibration mode of the three vibration modes to be excited.

3. A method according to claim 1, wherein natural frequencies of said plurality of vibration modes are approximately coincided.

4. A method according to claim 1, wherein natural frequencies of said three vibration modes are shifted from one another by a fixed quantity of frequency.

5. A method according to claim 1, wherein a force factor of a vibration mode to be excited is decreased and a force factor of a vibration mode to be used for detection is increased.

6. A method for detecting an angular velocity comprising:
   obtaining from a vibration member three vibration modes having components movable in three orthogonal axial directions which orthogonal axial directions are intersecting; and
   detecting an angular velocity around an axis of each of two of the axial directions by exciting one of said three vibration modes and detecting a vibration of the other two vibration modes,
   wherein one of said three vibration modes is a longitudinal vibration mode in one of the three axial directions and the other two vibration modes are bending vibration modes in different planes with a phase difference of 90° which planes include axes of the three axial directions.

7. A method according to claim 6, wherein an angular velocity around each axis of two of the axial directions is detected by exciting one of said three vibration modes and detecting the vibration of the other two vibration modes.

8. A method according to claim 6, wherein a force factor of a vibration mode to be excited is decreased and a force factor of a vibration mode to be used for detection is increased.

9. An apparatus for detecting an angular velocity comprising:
   a vibration member for exciting and detecting a vibration in a plurality of different directions; and
   detection means for detecting the angular velocity by detecting a first vibration in predetermined ones of the different directions when a second vibration in another one of the different directions is excited by said vibration member,
   wherein said vibration member enables excitation and detection of respective vibrations in three axial directions which orthogonally intersect one another through axes of the three axial directions,
   wherein said vibration member is provided with a plurality of energy conversion elements and said detection means executes excitation of the vibration through electro-mechanical conversion with a drive signal supplied to one of said plurality of energy conversion elements and detects the angular velocity through mechanic-electrical conversion of the other of the plurality of energy conversion elements, and
   wherein the angular velocity is detected by a first vibration mode for excitation and detection of torsional vibration around an axis of one of the three axial directions, and second and third vibration modes for excitation and detection of two bending vibration modes in different planes with a phase difference of 90°, which planes include the axes of the three axial directions.

10. An apparatus according to claim 9, wherein said vibration member is provided with at least three energy conversion elements and said detection means excites the vibration of the axis of one of the three axial directions through electro-mechanical conversion with a drive signal supplied to at least one energy conversion element and detects the angular velocity as to other axes of the three axial directions through the mechanic-electrical conversion of at least two other energy conversion elements.

11. An apparatus according to claim 9, wherein said vibration member is provided with a plurality of piezoelectric elements having electrodes which are polarized to cause a distortion in the three axial directions which orthogonally intersect one another through the axes of the three axial directions.

12. An apparatus according to claim 9, wherein the vibration to be excited is changed over in time series to enable detection of the angular velocity in the three axial directions.

13. An apparatus according to claim 9, wherein said vibration member has a plurality of tubular vibration elastic members having different diameters.

14. An apparatus according to claim 9, further comprising second detection means for detecting an amplitude of vibration to be excited which is provided on said vibration member so that the amplitude of vibration is controlled according to an output of said second detection means.

15. An apparatus according to claim 9, wherein said vibration member is supported on a support block with a support bar.

16. An apparatus according to claim 9, wherein natural frequencies of the vibrations used for detection approximately coincide.

17. An apparatus according to claim 9, wherein natural frequencies of the vibrations for excitation and detection approximately coincide.

18. An apparatus according to claim 9, wherein natural frequencies of the respective vibrations are set to be different from one another by a fixed quantity of frequency.

19. An apparatus for detecting an angular velocity comprising:

a vibration member for exciting and detecting a vibration in a plurality of different directions; and detection means for detecting the angular velocity by detecting a first vibration in predetermined ones of the different directions when a second vibration in another one of the different directions is excited by said vibration member, wherein said vibration member enables excitation and detection of respective vibrations in three axial directions which orthogonally intersect one another through axes of the three axial directions, wherein said vibration member is provided with a plurality of energy conversion elements and said detection means executes excitation of the vibration through electro-mechanical conversion with a drive signal supplied to one of said plurality of energy conversion elements and detects the angular velocity through mechanic-electrical conversion of the other of the plurality of energy conversion elements, and wherein the angular velocity is detected by a first vibration mode for excitation and detection of longitudinal vibration in one of the axes of the three axial directions, and second and third vibration modes for excitation and detection of bending vibration modes in different planes with a phase difference of 90°, which planes include the axes of the three axial directions.

20. An apparatus according to claim 19, wherein said vibration member is provided with at least three energy conversion elements and said detection means excites the vibration of the axis of one of the three axial directions through electro-mechanical conversion with a drive signal supplied to at least one energy conversion element and detects the angular velocity as to other axes of the three axial directions through the mechanic-electrical conversion of at least two other energy conversion elements.

21. An apparatus according to claim 19, wherein the vibration to be excited is changed over in time series to enable detection of the angular velocity in the three axial directions.

22. An apparatus according to claim 19, wherein said vibration member has a plurality of tubular vibration elastic members having different diameters.

23. An apparatus according to claim 19, further comprising second detection means for detecting an amplitude of vibration to be excited which is provided on said vibration member so that the amplitude of vibration is controlled according to an output of said second detection means.

24. An apparatus according to claim 19, wherein said vibration member is supported on a support block with a support bar.

25. An apparatus according to claim 19, wherein natural frequencies of the vibrations used for detection approximately coincide.

26. An apparatus according to claim 19, wherein natural frequencies of the vibrations for excitation and detection approximately coincide.

27. An apparatus according to claim 19, wherein natural frequencies of the respective vibrations are set to be different from one another by a fixed quantity of frequency.

* * * * *

UNITED STATES PATENT AND TRADEMARK OFFICE
CERTIFICATE OF CORRECTION

PATENT NO. : 5,625,145
DATED : April 29, 1997
INVENTOR(S) : MAENO, et al.

It is certified that error appears in the above-indentified patent and that said Letters Patent is hereby corrected as shown below:

On the Cover Page, In References Cited,
    Under FOREIGN PATENT DOCUMENTS:

"88061114    3/1988    Japan.
      89016911    1/1989    Japan.
      89140013    6/1989    Japan.
      90218914    8/1989    Japan.
      90198315    8/1990    Japan.
      92025714    1/1992    Japan."

should read

--63-6114    3/1988    Japan.
      64-16911    1/1989    Japan.
      1-140013    6/1989    Japan.
      2-218914    8/1990    Japan.
      2-198315    8/1990    Japan.
      4-25714    1/1992    Japan.--

UNITED STATES PATENT AND TRADEMARK OFFICE
CERTIFICATE OF CORRECTION

Page 2 of 2

PATENT NO. : 5,625,145
DATED : April 29, 1997
INVENTOR(S) : MAENO, et al.

It is certified that error appears in the above-indentified patent and that said Letters Patent is hereby corrected as shown below:

Column 4

Line 28, "elements." should read --elements--.

Column 7

Line 30, "symmetricity" should read --symmetry--.

Signed and Sealed this

Twenty-seventh Day of January, 1998

Attest:

BRUCE LEHMAN

*Attesting Officer*     *Commissioner of Patents and Trademarks*